United States Patent Office 2,846,589
Patented Aug. 5, 1958

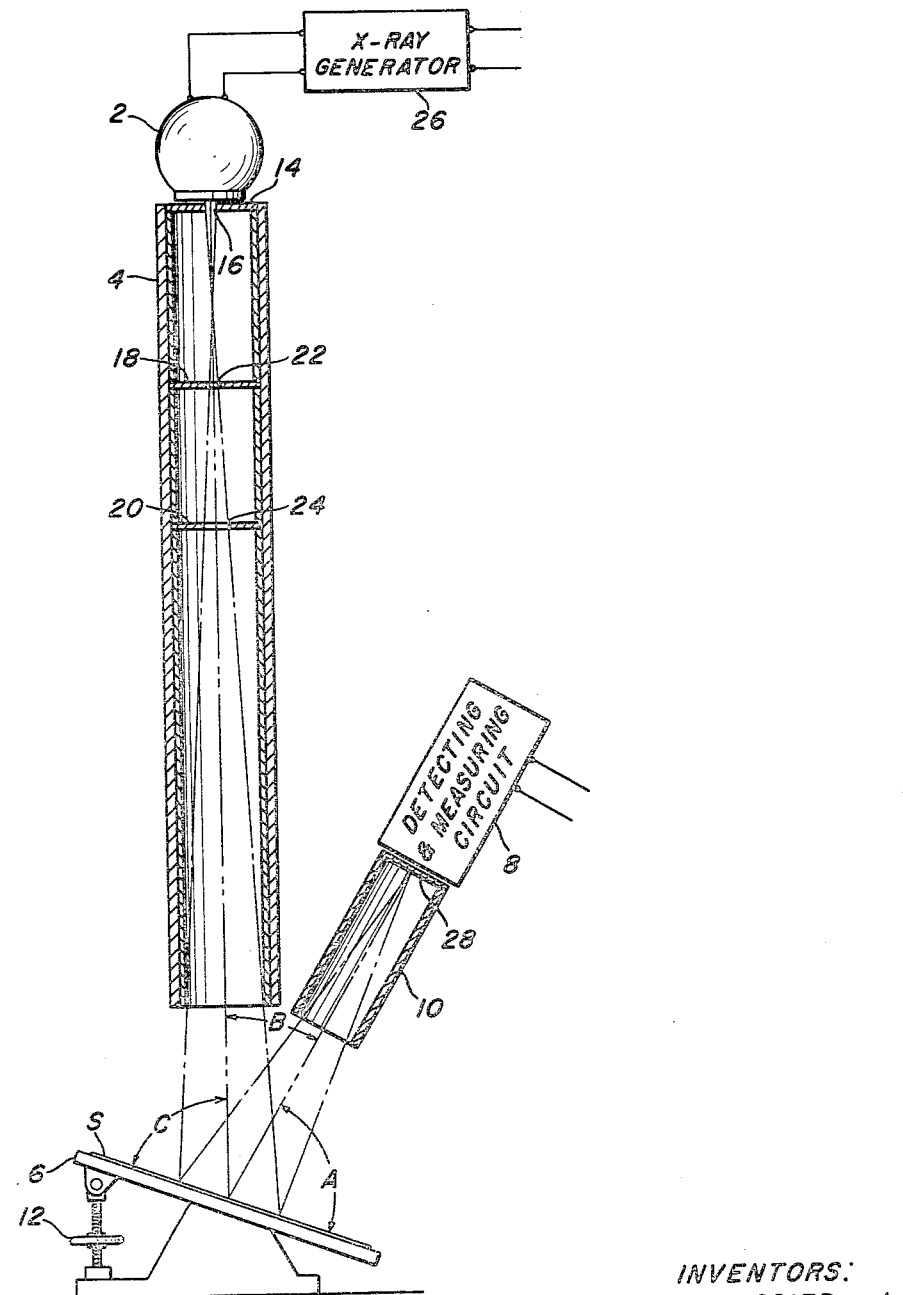

2,846,589

APPARATUS FOR DETERMINING THE THICKNESS OF ZINC COATING ON A FERROUS METAL BASE

George E. Pellissier and Everett E. Wicker, Pittsburgh, Pa., assignors to United States Steel Corporation, a corporation of New Jersey Application April 1, 1954, Serial No. 420,337

2 Claims. (Cl. 250—86)

This invention relates to apparatus for determining the thickness of zinc coating on a ferrous metal base and is particularly directed to the use of X-ray fluorescence for that purpose. The measurement of the coating thickness on galvanized sheets and strip is at present commonly performed by chemical methods that are time-consuming, destructive and subject to inaccuracy. The use of X-ray fluorescence to determine coating thickness has been suggested in the patents to Carroll et al. No. 2,642,537, dated June 16, 1953, McCartney et al. No. 2,578,722, dated December 18, 1951, and Beeghly No. 2,521,772, dated September 12, 1950. The apparatus and methods used in these patents are suitable for obtaining the thickness of tin coating on tin plate but we have found that they are not suitable for obtaining the thickness of zinc on galvanized sheets. The reason for this is that the zinc coating also emits radiation which makes it impossible to accurately determine the coating thickness. Since the excitation voltage for zinc characteristic radiation is 9.6 kv. and that of iron is 7.0 kv., excitation of the zinc coating cannot be avoided when exciting the ferrous base.

It is therefore an object of our invention to provide apparatus for measuring the thickness of the zinc coating on a ferrous metal base in which the zinc radiation is suppressed or minimized before it reaches the detector.

This and other objects will be more apparent after referring to the following specification and attached drawings, in which:

The single figure is a schematic view of the apparatus of our invention.

Referring more particularly to the drawing, the reference numeral 2 indicates an X-ray tube arranged to direct a primary X-ray beam through a lead lined tube 4 at a galvanized plate specimen S which is mounted on a tiltable table 6. A radiation detector and measuring circuit 8, such as a Geiger counter, photomultipler tube or ionization gage, is provided adjacent the specimen S on the same side thereof as tube 2 so as to receive a beam of fluorescent or secondary X-rays emerging from the specimen S. A tube 10 may be provided to protect the workmen from stray X-ray beams. In order to maintain a constant D. C. voltage on the detector, a voltage stabilizer is incorporated in the detector and measuring circuit 8. An adjusting screw 12 is provided on table 6 for changing the emergent angle A between the detector and the specimen S independently of the angle B between the detector 8 and tube 2. A lead shield 14 is provided at the end of the tube 4 adjacent tube 2 and has a very small aperture 16 therein. Also located in tube 4 are spaced apart lead shields 18 and 20 having openings 22 and 24 therein. The X-ray tube 2 is preferably driven by a full wave rectified X-ray diffraction generator 26. In order to maintain the X-ray tube voltage and current constant, a voltage stabilizer is incorporated in the X-ray generator 26. The X-ray tube is preferably operated at a minimum of 35 kv. and 15 ma. and its beam is collimated by the apertures 22 and 24. The specimen is preferably located so that its surface makes an angle C of at least 70° with the X-ray beam and is 10 inches from the focal spot. Angle A between the axis of the Geiger counter and the surface of the specimen S should be as close to 90° as possible and is preferably at least 80° as shown. Therefore angle B is equal to 30°. The apparatus so far described is essentially that as shown in the above identified McCartney et al. patent. We have found that by insetring a filter 28 between the specimen and the detector circuit 8, which filter is made of nickel, iron or iron-nickel alloys, the majority of the zinc characteristic radiation will be absorbed and a true reading will be taken on the measuring circuit 8. The filter 28 is preferably between .001 and .003 inch thick.

The operation of the device is as follows:

The primary X-ray beam passes through the zinc coating of the ferrous base metal and causes the ferrous base to strongly emit characteristic fluorescent X-rays. These fluorescent X-rays pass through the zinc coating with part of the X-rays being absorbed. The amount of absorption depends on the thickness of the coating. The remainder of the fluorescent X-ray beam is directed to the radiation detector and measuring circuit 8 which measures the intensity of the fluorescent X-rays emerging from the material being measured. The primary X-ray beam also causes the zinc coating to emit characteristic fluorescent X-rays. These later X-rays are absorbed by the filter 28 so that they will not be measured by the radiation detector 8. In the event that a Geiger counter tube is being used as a radiation detector, the measuring circuit then records the number of counts recorded in a known time interval or the length of time required to accumulate a given count. The number of counts then permits determination of the zinc coating weight from a calibration curve which has previously been established by making similar measurements on a series of galvanized plate samples of different known coatings. The coating weight can be directly indicated by attaching an indicating meter or recorder to the measuring circuit. Alternatively the measuring circuit may be a pulse rate meter whereby an instantaneous measurement of counts is determined which permits instantaneous determination of coating thickness and lends itself to the continuous determination of coating thickness on moving material. If desired equipment can be used to measure the coating thickness on both sides of the galvanized sheet.

While one embodiment of our invention has been shown and described it will be apparent that other adaptations and modifications may be made without departing from the scope of the following claims.

We claim:

1. Apparatus for determining the thickness of a zinc coating on a ferrous metal base comprising an X-ray tube arranged to direct a primary X-ray beam into the base material, a radiation detector arranged on the same side of the ferrous metal base as the X-ray tube for detecting fluorescent radiation from the ferrous metal base, and a filter located between the ferrous metal base and the radiation detector, said filter being formed of a material of the class consisting of nickel, iron and nickel-iron alloys.

2. Apparatus for determining the thickness of a zinc coating on a ferrous metal base comprising an X-ray tube arranged to direct a primary X-ray beam into the base material, the surface of said base material making an angle of at least approximately 70° with the X-ray beam, a radiation detector arranged on the same side of the ferrous metal base as the X-ray tube for detecting fluorescent radiation from the ferrous metal base, the surface of said base material making an angle of at least approximately 80° with the axis of said radiation detector, and a filter located between the ferrous metal base and the radiation detector, said filter being approximately between .001 and .003 inch thick and formed of a material of the class consisting of nickel, iron and nickel-iron alloys.

References Cited in the file of this patent

UNITED STATES PATENTS

| | | |
|---|---|---|
| 1,624,443 | St. John | Apr. 27, 1927 |
| 2,079,900 | Cohn | May 11, 1937 |
| 2,428,796 | Friedman | Oct. 14, 1947 |
| 2,521,772 | Beeghly | Sept. 12, 1950 |
| 2,578,722 | McCartney et al. | Dec. 18, 1951 |